United States Patent
Kondou et al.

(10) Patent No.: US 12,462,986 B2
(45) Date of Patent: Nov. 4, 2025

(54) ELECTROLYTIC CAPACITOR AND METHOD FOR PRODUCING SAME

(71) Applicant: Panasonic Intellectual Property Management Co., Ltd., Osaka (JP)

(72) Inventors: Shinji Kondou, Kanagawa (JP); Kazuya Yamasaki, Kyoto (JP); Takashi Kawasaki, Osaka (JP); Koji Yokoyama, Miyagi (JP); Hitoshi Ishimoto, Hyogo (JP); Yoshihisa Nagasaki, Osaka (JP); Yuji Miyachi, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 18/553,176

(22) PCT Filed: Apr. 12, 2022

(86) PCT No.: PCT/JP2022/017574
§ 371 (c)(1),
(2) Date: Sep. 28, 2023

(87) PCT Pub. No.: WO2022/220235
PCT Pub. Date: Oct. 20, 2022

(65) Prior Publication Data
US 2024/0177940 A1      May 30, 2024

(30) Foreign Application Priority Data
Apr. 15, 2021   (JP) .................. 2021-069303

(51) Int. Cl.
*H01G 9/028*    (2006.01)
*H01G 9/00*     (2006.01)
*H01G 9/15*     (2006.01)

(52) U.S. Cl.
CPC .......... *H01G 9/028* (2013.01); *H01G 9/0036* (2013.01); *H01G 9/15* (2013.01)

(58) Field of Classification Search
None
See application file for complete search history.

(56) References Cited

U.S. PATENT DOCUMENTS

| | | | |
|---|---|---|---|
| 2009/0161299 A1* | 6/2009 | Nemoto | H01G 2/065 29/25.03 |
| 2010/0271757 A1* | 10/2010 | Ishikawa | H01G 9/028 427/487 |

(Continued)

FOREIGN PATENT DOCUMENTS

| | | |
|---|---|---|
| JP | 10-321473 | 12/1998 |
| JP | 10-321474 | 12/1998 |

(Continued)

OTHER PUBLICATIONS

International Search Report of PCT application No. PCT/JP2022/017574 dated Jul. 12, 2022.

*Primary Examiner* — Dion R. Ferguson
(74) *Attorney, Agent, or Firm* — WHDA, LLP (57) ABSTRACT

An electrolytic capacitor includes an anode body, a dielectric layer covering the anode body, a first solid electrolyte layer covering the dielectric layer, and a second solid electrolyte layer covering the first solid electrolyte layer. The first solid electrolyte layer contains a first conductive polymer including polythiophene as a basic skeleton. The second solid electrolyte layer contains a second conductive polymer including polypyrrole as a basic skeleton. A conductivity of the first solid electrolyte layer is less than or equal to 2 S/cm.

9 Claims, 2 Drawing Sheets

(56) References Cited

U.S. PATENT DOCUMENTS

| | | | | |
|---|---|---|---|---|
| 2014/0334069 A1* | 11/2014 | Petrzilek | ............. | H01G 9/0036 |
| | | | | 427/80 |
| 2019/0148080 A1* | 5/2019 | Fukui | ................. | H01G 9/15 |
| | | | | 361/525 |
| 2020/0082994 A1* | 3/2020 | Fukui | ................ | H01G 9/028 |
| 2020/0168404 A1* | 5/2020 | Fukui | ................ | H01G 9/028 |
| 2022/0084756 A1* | 3/2022 | Fukui | ................ | H01G 9/028 |
| 2024/0161985 A1* | 5/2024 | Kondou | ............... | H01G 9/00 |
| 2024/0177940 A1* | 5/2024 | Kondou | ............... | H01G 9/028 |

FOREIGN PATENT DOCUMENTS

| | | | | |
|---|---|---|---|---|
| JP | 2002-252149 | | 9/2002 | |
| JP | 2008-118060 | | 5/2008 | |
| JP | 2011-192688 | | 9/2011 | |
| JP | 4767150 B | | 9/2011 | |
| WO | WO-9967797 A1 * | 12/1999 | ............ | H01G 11/48 |
| WO | 2018/221096 | | 12/2018 | |
| WO | 2018/235434 | | 12/2018 | |
| WO | 2020/153242 | | 7/2020 | |

\* cited by examiner

ELECTROLYTIC CAPACITOR AND METHOD FOR PRODUCING SAME

TECHNICAL FIELD

The present invention relates to an electrolytic capacitor and a method for producing the same.

BACKGROUND

An electrolytic capacitor includes a capacitor element, and the capacitor element includes an anode body, a dielectric layer covering the anode body, and a solid electrolyte layer covering the dielectric layer. The solid electrolyte layer contains a conductive polymer, and as the conductive polymer, for example, polypyrrole is used (for example, Unexamined Japanese Patent Publication No. 2008-118060).

SUMMARY

Solution to Problem

One aspect of the present invention relates to an electrolytic capacitor. The electrolytic capacitor includes an anode body, a dielectric layer covering the anode body, a first solid electrolyte layer covering the dielectric layer, and a second solid electrolyte layer covering the first solid electrolyte layer. The first solid electrolyte layer contains a first conductive polymer including polythiophene as a basic skeleton, and the second solid electrolyte layer contains a second conductive polymer including polypyrrole as a basic skeleton. A conductivity of the first solid electrolyte layer is less than or equal to 2 S/cm.

Another aspect of the present invention relates to a method for producing an electrolytic capacitor. The method includes a first step of preparing an anode body on which a dielectric layer is formed, a second step of forming a first solid electrolyte layer containing a first conductive polymer on the dielectric layer, the first conductive polymer including polythiophene as a basic skeleton, and a third step of forming a second solid electrolyte layer containing a second conductive polymer by performing electrolytic polymerization of a precursor of the second conductive polymer on the first solid electrolyte layer, the second conductive polymer including polypyrrole as a basic skeleton. A conductivity of the first solid electrolyte layer is less than or equal to 2 S/cm.

The present invention can reduce the ESR of an electrolytic capacitor.

Although novel features of the present invention are set forth in the appended claims, the present invention will be better understood by the following detailed description with the drawings, taken in conjunction with other objects and features of the present invention, both as to construction and content.

DESCRIPTION OF EMBODIMENT

Hereinafter, an exemplary embodiment of an electrolytic capacitor according to the present disclosure will be described with reference to examples, but the present disclosure is not limited to the examples to be described below. Although specific numerical values and materials may be provided as examples in description below, other numerical values and materials may be applied as long as the effect of the present disclosure can be obtained. In this specification, the description "numerical value A to numerical value B" includes numerical value A and numerical value B, and can be read as "from numerical value A to numerical value B, inclusive". In the following description, when a lower limit and an upper limit of a numerical value related to a specific physical property, condition, or the like are exemplified, any of the exemplified lower limits and any of the exemplified upper limits can be freely combined unless the lower limit is more than or equal to the upper limit. When a plurality of materials are exemplified, one of the materials may be selected and used singly, or two or more of the materials may be used in combination.

The present disclosure encompasses a combination of matters recited in two or more claims freely selected from a plurality of claims recited in the appended claims. That is, as long as no technical contradiction arises, matters described in two or more claims freely selected from a plurality of claims described in the appended claims can be combined.

"Electrolytic capacitor" may be read as "solid electrolytic capacitor".

An electrolytic capacitor according to one exemplary embodiment of the present invention includes an anode body, a dielectric layer covering the anode body, a first solid electrolyte layer covering the dielectric layer, and a second solid electrolyte layer covering the first solid electrolyte layer. The first solid electrolyte layer (hereinafter, also referred to as first layer) contains a first conductive polymer (hereinafter, also referred to as polythiophene polymer) including polythiophene as a basic skeleton, and has a conductivity of less than or equal to 2 S/cm. The second solid electrolyte layer (hereinafter, also referred to as second layer) contains a second conductive polymer (hereinafter, also referred to as polypyrrole polymer) including polypyrrole as a basic skeleton.

The second layer containing the polypyrrole polymer is formed by performing electrolytic polymerization on a precursor of the polypyrrole polymer on the first layer after forming the first layer having conductivity on the dielectric layer formed on a surface of the anode body. The first layer functions as an electrode when the electrolytic polymerization is performed. By the electrolytic polymerization, a favorable second layer is formed. The inventors of the present invention have conducted intensive studies on the first layer. As a result, it has been newly found that the ESR of an electrolytic capacitor including the second layer containing the polypyrrole polymer is reduced when the first layer contains the polythiophene polymer and has a conductivity of less than or equal to 2 S/cm.

When the first layer contains the polythiophene polymer and has a conductivity of less than or equal to 2 S/cm, a specifically low ESR is obtained in the electrolytic capacitor including the second layer containing the polypyrrole polymer. Although the detailed reason is unknown, the following is presumed as a factor of the reduction in ESR.

A short circuit may occur due to crystallization or cracks generated in a part of the dielectric layer, and thus a high current may flow. At this time, an insulation of a part of the conductive polymer usually occurs due to the high current, and thus the short circuit can be suppressed. On the other hand, the insulation increases the resistance of the solid electrolyte layer to cause the ESR increase.

In the present invention, the conductivity of the first layer is as small as less than or equal to 2 S/cm, the insulation is easily performed in the first layer, and thus insulation of the second layer is suppressed by the insulation of the first layer. In addition, since the first layer is used as an electrode in electrolytic polymerization, the first layer is formed to be sufficiently thinner than the second layer. Since the first layer having a small thickness is locally insulated, the influence for the insulation of the entire solid electrolyte layer can be reduced. Hence, the resistance of the second layer can be maintained low, and thus an increase in ESR is reduced.

It is predicted that deterioration of the first layer easily affects the ESR. However, by forming the first layer with a polythiophene polymer film that is excellent in thermal stability and durability, an increase in ESR due to deterioration of the first layer is reduced. In addition, when the first layer is a polythiophene polymer film, a difference in energy level (work function) between the first layer and a polypyrrole polymer film (second layer) formed by electrolytic polymerization is small as compared with a case where the first layer is a polypyrrole polymer film formed by chemical polymerization or a polyaniline polymer film. This is also presumed as a factor of the reduction in ESR.

From the viewpoint of reducing the ESR, the conductivity of the first layer ranges preferably from 0.1 S/cm to 2 S/cm, inclusive, more preferably from 0.1 S/cm to 1 S/cm, inclusive, and still more preferably from 0.1 S/cm to 0.5 S/cm, inclusive. When the conductivity of the first layer is more than or equal to 0.1 S/cm, a decrease in capacitance is likely to be prevented.

The conductivity of the first layer may be determined by the following method.

The electrolytic capacitor is disassembled, the capacitor element is taken out, and the component of the first layer is analyzed. When the first layer is formed using a first treatment liquid in a second step described later, the first treatment liquid may be analyzed. As the analysis method, the transmission electron microscope-electron energy loss spectroscopy (TEM-EELS) method, the nuclear magnetic resonance spectroscopy (NMR) method, Raman spectroscopy, or the like may be used.

Based on the analysis result, a sample film (for example, having a thickness of 20 μm to 40 μm) containing the same component as that of the first layer is formed, and the conductivity of the sample film is obtained as the conductivity of the first layer. The sample film may be formed by preparing a sample liquid (aqueous solution) containing the same component (for example, a self-doped type polythiophene polymer) as that of the first layer, applying the sample liquid to a substrate, and drying the sample liquid. The sample film may be formed using the first treatment liquid. As a conductivity measuring device, Loresta-GX and a PSP probe manufactured by Nittoseiko Analytech Co., Ltd. may be used.

The conductivity of the first layer is low. However, making the first layer thin can reduce an increase in ESR. From the viewpoint of reducing the ESR, thickness T1 of the first layer is preferably less than or equal to 10 nm, and more preferably less than or equal to 5 nm. The lower limit of thickness T1 of the first layer is, for example, 1 nm.

Thickness T1 of the first layer means a thickness (thickness T1 in FIG. 2) of the first layer covering an inner wall surface of a porous part of the anode body with the dielectric layer interposed therebetween. The thickness of the first layer may be determined by the following method. First, the electrolytic capacitor is disassembled, the capacitor element is taken out, and an image of a section of the capacitor element is obtained using a transmission electron microscope (TEM). The thickness of any 10 points of the first layer covering the inner wall surface of the porous part is measured using the image. An average value of the measured values of the thickness is calculated. The first layer and the second layer can be confirmed by, for example, analysis (element mapping) of energy dispersive X-ray spectroscopy (TEM-EDX).

From the viewpoint of reducing the ESR, the second layer is preferably larger in thickness and higher in conductivity than the first layer. From the viewpoint of reducing the ESR, the conductivity of the second layer may be more than or equal to 30 S/cm, or may be more than or equal to 60 S/cm. From the viewpoint of reducing leakage current, the conductivity of the second layer may be less than or equal to 300 S/cm, or may be less than or equal to 150 S/cm. The conductivity of the second layer may be in a range obtained by freely combining the upper limits and lower limits, and it may range, for example, from 30 S/cm to 300 S/cm, inclusive, from 60 S/cm to 300 S/cm, inclusive, or from 30 S/cm to 150 S/cm, inclusive.

Thickness T2 of the second layer may be more than or equal to 50 nm, and may range from 50 nm to 100 nm, inclusive. The ratio T2/T1 of thickness T2 of the second layer to thickness T1 of the first layer may be more than or equal to 10. Thickness T2 of the second layer means a thickness (thickness T2 in FIG. 2) of the second layer covering an outer surface of the porous part of the anode body with the dielectric layer and the first layer (or dielectric layer) interposed therebetween. The thickness of the second layer may be determined by the same method as in the case of the thickness of the first layer.

The conductivity of the second layer may be determined by the same method as in the case of the first layer. Based on the analysis result, a sample film (for example, having a thickness ranging from 20 μm to 40 μm) containing the same component as that of the second layer is formed, and the conductivity of the sample film may be obtained as the conductivity of the second layer.

The second layer is formed by performing electrolytic polymerization on a precursor of the polypyrrole polymer in the presence of a second dopant. Thus, a sample film having the same components as those of the second layer (the polypyrrole polymer and the second dopant) may be formed by preparing a sample solution containing a precursor of the polypyrrole polymer and the second dopant, immersing a metal substrate in the sample solution, applying a current to the metal substrate, and performing electrolytic polymerization on the precursor. When the second layer is formed using a second treatment liquid in a third step described later, the second treatment liquid may be analyzed, or a sample film may be formed using the second treatment liquid.

Hereinafter, an electrolytic capacitor and a method for producing the electrolytic capacitor will be described more specifically.

[Electrolytic Capacitor]

(Anode Body)

The anode body may include a valve metal, an alloy containing the valve metal, a compound containing the valve metal, or the like. These materials may be used singly or in combination of two or more of these materials. Preferably available examples of the valve metal include aluminum, tantalum, niobium, and titanium. The anode body may include a porous part on a surface layer. Such an anode body is obtained, for example, by roughening a surface of a base material (for example, a foil-like or plate-like base material) containing the valve metal by etching or the like. The anode body may be a molded body of particles containing the valve metal or a sintered body thereof. Since the sintered body has a porous structure, the entire anode body may be the porous part.

(Dielectric Layer)

The dielectric layer is formed, for example, by subjecting the anode body containing the valve metal to a chemical conversion treatment (anodizing treatment). It is sufficient that the dielectric layer is formed so as to cover at least a part of the anode body. The dielectric layer is usually formed on the surface of the anode body. The dielectric layer is formed on the surface of the porous part of the anode body, and is formed along the outer surface of the porous part and the inner wall surface of pores (pits).

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited to such materials, and any dielectric layer may be used as long as the dielectric layer functions as a dielectric material.

(Solid Electrolyte Layer)

The solid electrolyte layer is formed so as to cover the dielectric layer. The solid electrolyte layer does not necessarily cover the whole (a whole surface of) dielectric layer as long as the solid electrolyte layer is formed so as to cover at least a part of the dielectric layer. The solid electrolyte layer includes the first layer containing a polythiophene polymer and the second layer containing a polypyrrole polymer formed on the first layer. When there is a region where the first layer is not formed on the dielectric layer, the second layer may be formed on the dielectric layer in this region.

(First Layer)

The first layer contains a polythiophene polymer. The polythiophene polymer includes polythiophene and derivatives thereof. Examples of the polythiophene polymer include poly(3,4-ethylenedioxythiophene) (PEDOT).

From the viewpoint of easy impregnation into the pores of the porous part, the weight-average molecular weight of the polythiophene polymer may be less than or equal to 100,000 or less than or equal to 30,000. The weight-average molecular weight of the polythiophene polymer is, for example, more than or equal to 1,000. In the present description, the weight-average molecular weight is a weight-average molecular weight based on polystyrene measured by gel permeation chromatography (GPC).

The first layer may contain a self-doped type polythiophene polymer having a conductivity of less than or equal to 2 S/cm. The self-doped type polythiophene polymer particles are likely to be small. Thus, in this case, it is easy to prepare a dispersion of the polythiophene polymer or a solution of the polythiophene polymer as the first treatment liquid. In addition, it is easy to impregnate the pores of the porous part with the dispersion (solution) of the polythiophene polymer.

The self-doped type polythiophene polymer refers to a conductive polymer having an anionic group directly or indirectly bonded to a polythiophene skeleton of the conductive polymer via a covalent bond. The anionic group of the conductive polymer itself functions as a dopant of the conductive polymer, and thus is referred to as self-doped type. The anionic group includes, for example, an acidic group (acid type) or a conjugated anionic group (salt type) thereof.

Examples of the anionic group of the polythiophene polymer include a sulfonic acid group, a carboxy group, a phosphate group, a phosphonic acid group, and salts thereof (salts with inorganic bases, salts with organic bases, etc.). The polythiophene polymer may have one type of anionic group or two or more types of anionic groups. The anionic group is preferably the sulfonic acid group or the salt thereof, and may be a combination of a sulfonic acid group or a salt thereof and an anionic group other than the sulfonic acid group or a salt thereof. The amount of the anionic group in the polythiophene polymer is, for example, preferably one to three, more preferably one or two (in particular, one) per molecule corresponding to the main skeleton of the polythiophene polymer.

The first layer may contain a non-self-doped type polythiophene polymer or may contain a first dopant. The first layer may contain a polythiophene polymer composite of a polythiophene polymer and a first dopant, the composite having a conductivity of less than or equal to 2 S/cm. In the first layer, the first dopant may be contained in the form of an anion or in the form of a salt.

Examples of the non-self-doped type conductive polymer include conductive polymers that do not have an anionic group (specifically, a sulfonic acid group, a carboxy group, a phosphoric acid group, a phosphonic acid group, and salts thereof) directly or indirectly bonded covalently to the polythiophene skeleton of the conductive polymer.

As the first dopant, for example, a dopant capable of forming a polyanion is used. Examples of the first dopant include polyvinylsulfonic acid, polystyrenesulfonic acid, polyallylsulfonic acid, polyacrylsulfonic acid, and polymethacrylsulfonic acid.

The first layer may include a conductive polymer other than the polythiophene polymer, but the content proportion of the polythiophene polymer is preferably large. The proportion of the polythiophene polymer in the entire conductive polymer included in the first layer is, for example, more than or equal to 90 mass %, and may be 100 mass %.

The first layer may be formed of a single layer or may be formed of a plurality of layers. When the first layer is formed of a plurality of layers, the polythiophene polymers included in each layer may be the same or different. The first layer may further include other components as long as the effects of the present invention are not impaired.

(Second Layer)

The second layer contains a polypyrrole polymer. The polypyrrole polymer includes polypyrrole and derivatives thereof. A weight average molecular weight of the polypyrrole polymer is not particularly limited and ranges, for example, from 1,000 to 1,000,000, inclusive.

The second layer may include a non-self-doped type polypyrrole polymer or may contain a second dopant. Examples of the non-self-doped type polypyrrole polymer include conductive polymers that do not have an anionic group (specifically, a sulfonic acid group, a carboxy group, a phosphoric acid group, a phosphonic acid group, and salts thereof) directly or indirectly bonded to the polypyrrole skeleton of the conductive polymer via a covalent bond.

As the second dopant, for example, a dopant capable of forming an anion is used. Examples of the second dopant include sulfuric acid, nitric acid, phosphoric acid, boric acid, and an organic sulfonic acid. Examples of the organic sulfonic acid include an aromatic sulfonic acid. Examples of the aromatic sulfonic acid include benzenesulfonic acid, alkylbenzenesulfonic acid, naphthalenesulfonic acid, and alkylnaphthalenesulfonic acid.

In the second layer, the second dopant may form a polypyrrole polymer composite with the polypyrrole polymer. In the second layer, the second dopant may be contained in the form of an anion or in the form of a salt.

The second layer may include a conductive polymer other than the polypyrrole polymer, but the content proportion of the polypyrrole polymer is preferably large. The proportion of the polypyrrole polymer in the entire conductive polymer included in the second layer is, for example, more than or equal to 90 mass %, and may be 100 mass %.

The second layer may be formed of a single layer or may be formed of a plurality of layers. When the second layer is formed of a plurality of layers, the polypyrrole polymers included in each layer may be the same or different. The second layer may further contain other components as long as the effects of the present invention are not impaired.

Figure 1:
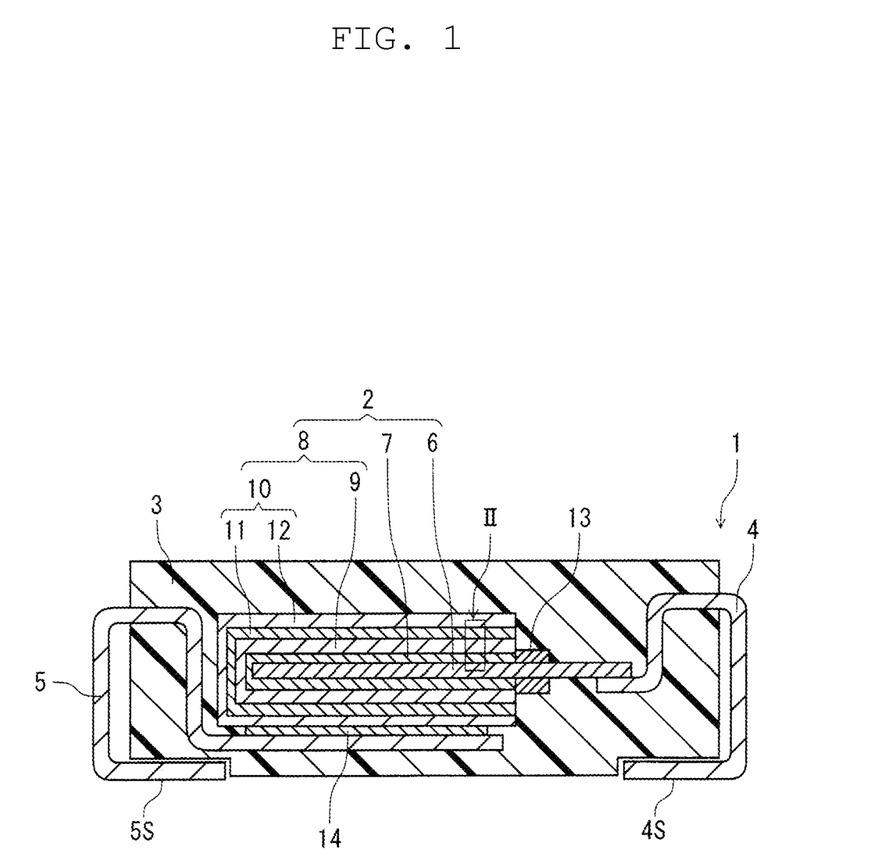
FIG. 1 is a sectional view schematically illustrating an electrolytic capacitor according to one exemplary embodiment of the present invention.
Figure 2:
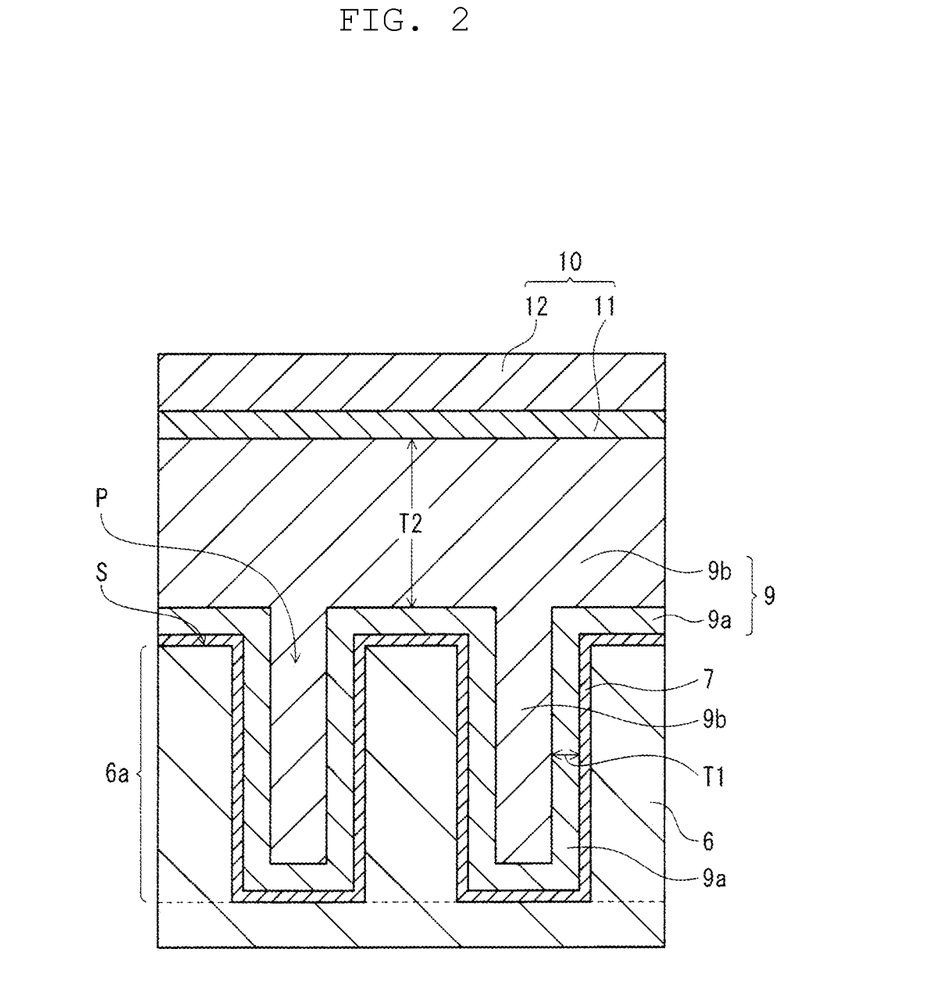
FIG. 2 is an enlarged sectional view schematically illustrating region II in FIG. 1.

FIG. 1 is a sectional view schematically illustrating a structure of an electrolytic capacitor according to one exemplary embodiment of the present invention. FIG. 2 is an enlarged sectional view schematically illustrating region II in FIG. 1. Electrolytic capacitor 1 includes capacitor element 2, resin sealing material (exterior body) 3 that seals capacitor element 2, and anode terminal 4 and cathode terminal 5 each of which is at least partially exposed to the outside of resin sealing material 3. Anode terminal 4 and cathode terminal 5 may be made of, for example, metal (such as copper or copper alloy). Resin sealing material 3 has a substantially rectangular parallelepiped outer shape, and electrolytic capacitor 1 also has a substantially rectangular parallelepiped outer shape. As a material of resin sealing material 3, for example, an epoxy resin may be used.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. Cathode lead-out layer 10 has carbon layer 11 and silver-paste layer 12.

Anode body 6 has porous part 6a, and includes a region facing cathode part 8 and a region not facing cathode part 8. Porous part 6a includes a large number of pores P. Pores P may be sponge-like pits or tunnel-like pits. In the region of anode body 6 not facing cathode part 8, insulating separation layer 13 is formed in a part adjacent to cathode part 8 so as to cover a surface of anode body 6 in a band shape, and contact between cathode part 8 and anode body 6 is restricted. In the region of anode body 6 not facing cathode part 8, the other part is electrically connected to anode terminal 4 by welding. Cathode terminal 5 is electrically connected to cathode part 8 via adhesive layer 14 formed of a conductive adhesive.

Main surface 4S of anode terminal 4 and main surface 5S of cathode terminal 5 are exposed from the same surface of resin sealing material 3. The exposed surface is used for, for example, solder connection to a substrate (not illustrated) on which electrolytic capacitor 1 is to be mounted.

Carbon layer 11 has conductivity and may be made of, for example, a conductive carbon material (such as graphite). For silver-paste layer 12, for example, a composition containing silver powder and a binder resin (such as epoxy resin) may be used. Cathode lead-out layer 10 is not limited to this configuration, and may be configured in any way as long as it has a current collecting function.

Solid electrolyte layer 9 is formed so as to cover dielectric layer 7. Dielectric layer 7 is formed along the surface of anode body 6 (outer surface S of porous part 6a and inner wall surface of pore P). On a surface of dielectric layer 7, irregularities corresponding to the shape of the surface of anode body 6 are formed. Solid electrolyte layer 9 is preferably formed so as to fill such irregularities of dielectric layer 7.

Solid electrolyte layer 9 includes first layer 9a and second layer 9b. First layer 9a is formed so as to cover outer surface S of porous part 6a and the inner wall surface of pore P with dielectric layer 7 interposed therebetween. Second layer 9b is formed so as to cover outer surface S of porous part 6a with dielectric layer 7 and first layer 9a interposed therebetween. Second layer 9b is also formed in pore P of porous part 6a, and is formed so as to cover the inner wall surface of pore P via dielectric layer 7 and first layer 9a. First layer 9a includes a polythiophene polymer, and second layer 9b includes a polypyrrole polymer. The conductivity of first layer 9a is less than or equal to 2 S/cm. First layer 9a and second layer 9b have thickness T1 and thickness T2, respectively.

The electrolytic capacitor according to the present exemplary embodiment is not limited to the electrolytic capacitor having the above structure, and may be applied to electrolytic capacitors having various structures. Specifically, the present invention may also be applied to a wound electrolytic capacitor, an electrolytic capacitor using a sintered body of metal powder as an anode body, and the like. The anode body may be a porous body in which a part of an anode lead is embedded, or an anode terminal and an anode lead may be electrically connected.

[Method for Producing Electrolytic Capacitor]

A method for producing an electrolytic capacitor according to one exemplary embodiment of the present invention includes a first step of preparing an anode body on which a dielectric layer is formed, a second step of forming a first layer on the dielectric layer, and a third step of forming a second layer on the first layer. The first layer includes a polythiophene polymer, and the second layer includes a polypyrrole polymer. The conductivity of the first layer is less than or equal to 2 S/cm. A solid electrolyte layer including the first layer and the second layer is formed by the second step and the third step. The method for producing an electrolytic capacitor may include a step of preparing an anode body prior to the first step. The method may further include a step of forming a cathode lead-out layer and/or a step of sealing a capacitor element.

Hereinafter, each step is described in more detail.

(Step of Preparing Anode Body)

In this step, an anode body is formed by a known method according to the type of the anode body.

The anode body may be prepared, for example, by roughening a surface of a foil-like or plate-like base material containing a valve metal. A porous part is formed on a surface layer of the anode body by the roughening. The roughening forms irregularities on the surface of the base material, and may be performed, for example, by etching (for example, electrolytically etching) the surface of the base material.

Alternatively, a valve metal (for example, tantalum) powder is provided, and in a state where one end side of a rod-like anode lead in a longitudinal direction is embedded in the powder, a molded body molded into a desired shape (for example, block-like shape) is obtained. This molded body may be sintered to form an anode body of porous structure in which one end of the anode lead is embedded.

(First Step)

In the first step, a dielectric layer is formed on the anode body. The dielectric layer is formed by anodizing the anode body. The anodizing may be performed by a known method, for example, an anodizing treatment. The anodizing treatment may be performed, for example, by immersing the anode body in an anodizing liquid to impregnate the surface of the anode body with the anodizing liquid, and applying a voltage between the anode body as an anode and a cathode immersed in the anodizing liquid. As the anodizing liquid, for example, a phosphoric acid aqueous solution or the like is preferably used.

(Second Step)

The second step may include step A of preparing the first treatment liquid and step B of attaching the first treatment liquid to the dielectric layer to form the first layer. In step B, for example, the anode body on which the dielectric layer is formed may be immersed in the first treatment liquid and then dried to form the first layer. In step B, the first treatment liquid may be applied or dropped onto the anode body on which the dielectric layer is formed, and then dried to form the first layer.

The first treatment liquid may contain a self-doped type polythiophene polymer (self-doped type) having a conductivity of less than or equal to 2 S/cm. In this case, a dispersion liquid containing fine particles of the polythiophene polymer or a solution of the polythiophene polymer is easily prepared as the first treatment liquid, and the pores of the porous part are easily impregnated with the dispersion (solution) of the polythiophene polymer. The first treatment liquid may contain a polythiophene polymer composite (a composite of the polythiophene polymer and the first dopant) having a conductivity of less than or equal to 2 S/cm. As the polythiophene polymer and the first dopant, those exemplified above may be used. The first treatment liquid may further contain other components.

As the first treatment liquid, for example, a dispersion (or solution) of the polythiophene polymer or a dispersion liquid (or solution) of a polythiophene polymer composite of the polythiophene polymer and the first dopant may be used. The first treatment liquid may be obtained, for example, by oxidatively polymerizing a precursor of the polythiophene polymer in a dispersion medium (or solvent). Examples of the precursor include a monomer constituting the polythiophene polymer and/or an oligomer in which some monomers are linked. The first treatment liquid containing the polythiophene polymer composite may be obtained by oxidatively polymerizing a precursor of the polythiophene polymer in a dispersion medium (or solvent) in the presence of the first dopant.

The conductivity of the first layer may be adjusted by, for example, polymerization conditions (for example, a type of a precursor of the polythiophene polymer, an oxidizing agent, or a catalyst) of the precursor of the polythiophene polymer, the type of the first dopant, and the like.

Examples of the dispersion medium (or solvent) of the first treatment liquid include water, an organic solvent, and a mixture thereof. Examples of the organic solvent include a monohydric alcohol (methanol, ethanol, propanol, etc.), a polyhydric alcohol (ethylene glycol, glycerin, etc.), and an aprotic polar solvent (N,N-dimethylformamide, dimethyl sulfoxide, acetonitrile, acetone, benzonitrile, etc.).

From the viewpoint of easily impregnating the pores of the porous part with the first treatment liquid, the average particle size of the particles of the polythiophene polymer (or polythiophene polymer composite) dispersed in the first treatment liquid may be less than or equal to 100 nm, or may be less than or equal to 50 nm. The lower limit of the average particle size is not particularly limited, and is, for example, more than or equal to 5 nm. Here, the average particle size means a median diameter (D50) in a volume-based particle size distribution. The average particle size of the polythiophene polymer (or the polythiophene polymer composite) may be determined, for example, from a particle size distribution by a dynamic light scattering method (DLS). Specifically, a particle size distribution of the particles is measured on a volume basis by a dynamic light scattering type particle size distribution measuring apparatus (LB-550 manufactured by HORIBA, Ltd.) using an aqueous dispersion of the particles (first treatment liquid), and a median diameter (D50) thereof is taken as the average particle size.

(Third Step)

In the third step, a precursor of a polypyrrole polymer is electrolytically polymerized on the first layer to form a second layer containing the polypyrrole polymer. In the third step, a precursor of a polypyrrole polymer (non-self-doped type) may be electrolytically polymerized on the first layer in the presence of a second dopant to form the second layer containing the polypyrrole polymer and the second dopant.

The second layer is formed by electrolytic polymerization using the second treatment liquid. The second layer is formed, for example, by immersing the anode body on which the dielectric layer and the first layer are formed in the second treatment liquid, and supplying power from a supply electrode using the first layer as an electrode. The second treatment liquid contains, for example, a precursor of the polypyrrole polymer, the second dopant, and a dispersion medium (or solvent).

Since the conductivity of the first layer is low, a large overvoltage may be generated during electrolytic polymerization. This may affect the formation of the second layer. In order to uniformly form a high-quality second layer on the first layer having low conductivity, it is desirable to perform electrolytic polymerization by applying a small current to the first layer.

As the polypyrrole polymer and the second dopant, those exemplified above may be used. Examples of the precursor of the polypyrrole polymer include a monomer constituting the polypyrrole polymer and/or an oligomer in which some monomers are linked. As the dispersion medium (or solvent), those exemplified in the first treatment liquid may be used. The second treatment liquid may further contain other components.

(Step of Forming Cathode Lead-Out Layer)

In this step, a cathode lead-out layer is formed by sequentially stacking a carbon layer and a silver paste layer on the second solid electrolyte layer formed in the third step. The capacitor element can be obtained by forming the cathode lead-out layer.

A conductive adhesive layer is disposed on the surface of the cathode lead-out layer, and one end of the cathode terminal is electrically connected to the capacitor element via the adhesive layer. As the cathode terminal, an electrode terminal used in electrolytic capacitors may be used without particular limitation, and for example, a terminal called a lead frame may be used.

(Step of Sealing Capacitor Element with Resin Sealing Material)

The capacitor element thus formed is sealed with a resin material together with, for example, a part of each of the anode terminal and the cathode terminal. This sealing forms the resin sealing material. The resin material is preferably a thermosetting resin (such as epoxy resin) or a resin composition. The resin sealing material contains a cured product of a thermosetting resin or a resin composition.

EXAMPLES

Hereinafter, the present invention is specifically described with reference to examples and comparative examples, but the present invention is not limited to the following examples.

Examples 1 to 5 and Comparative Examples 1 and 2

(Step of Forming Dielectric Layer on Surface of Anode Body)

As an anode body, a tantalum sintered body (porous body) in which a part of an anode lead was embedded was prepared. The tantalum sintered body has a rectangular parallelepiped shape, and the anode lead was planted from one end surface of the rectangular parallelepiped shape. The anode body was anodized in a phosphoric acid aqueous solution, whereby a dielectric layer containing tantalum oxide ($Ta_2O_5$) was formed on the surface of the anode body.

(Step of Forming First Layer)

As the first conductive polymer, an aqueous dispersion (first treatment liquid) containing a self-doped type polythiophene polymer having conductivity shown in Table 1 was prepared (step A). The concentration of the polythiophene polymer in the first treatment liquid was set to 4 mass %. The polythiophene polymer particles were very small particles having a level (particle size of less than 1 nm) that was difficult to measure by the DLS method. As the self-doped type polythiophene polymer, PEDOT having a sulfonic acid group directly bonded to a PEDOT skeleton was used. The anode body on which the dielectric layer was formed was immersed in the first treatment liquid and dried to form a first layer (step B).

(Step of Forming Second Layer)

An aqueous dispersion (second treatment liquid) containing pyrrole and a dopant (sulfonate having a naphthalene skeleton) was prepared. The concentration of the pyrrole in the second treatment liquid may be appropriately selected in a range from 1 mass % to 6 mass %, for example, and the concentration of the dopant in the second treatment liquid may be appropriately selected in a range from 3 mass % to 12 mass %, for example.

The anode body on which the dielectric layer and the first layer were formed was immersed in the second treatment liquid, and electrolytic polymerization of pyrrole was progressed using the first layer as an electrode to form a second layer (conductivity: 60 S/cm) containing polypyrrole.

A solid electrolyte layer formed of the first layer and the second layer was thus formed. Thickness T1 of the first layer was 5 nm. Thickness T2 of the second layer was 100 nm.

(Step of Forming Cathode Lead-Out Layer)

A dispersion in which graphite particles were dispersed in water was applied to the surface of the solid electrolyte layer, and then dried to form a carbon layer. Subsequently, a silver paste containing silver particles and a binder resin (epoxy resin) was applied onto the surface of the carbon layer, and then the binder resin was cured by heating to form a silver-paste layer. A cathode lead-out layer formed of the carbon layer and the silver paste layer was thus formed. A capacitor element was thus obtained.

(Step of Sealing Capacitor Element)

An anode terminal (anode lead frame) was welded to an anode lead, a cathode terminal (cathode lead frame) was connected to the cathode lead-out layer with a conductive adhesive, and the capacitor element was sealed with a resin sealing material. An electrolytic capacitor was thus produced.

In the step of forming the first layer, self-doped type polythiophene polymers having different conductivities were used as the first conductive polymer contained in the first treatment liquid, and the conductivity of the first layer was changed to the values shown in Table 1 to prepare electrolytic capacitors. A1 to A5 in Table 1 represent electrolytic capacitors of Examples 1 to 5, respectively. B1 and B2 represent electrolytic capacitors of Comparative Examples 1 and 2, respectively.

Comparative Example 3

In the step of forming the first layer, a first treatment liquid containing a self-doped type polyaniline polymer (conductivity: 0.1 S/cm) as the first conductive polymer was used, and the anode body on which the dielectric layer was formed was immersed in the first treatment liquid and dried to form a first layer containing the polyaniline polymer. As the self-doped type polyaniline polymer, polyaniline having a sulfonic acid group directly bonded to a polyaniline skeleton was used. Electrolytic capacitor B3 of Comparative Example 3 was produced in the same manner as in Example 1 except for the above.

[Evaluation]

An initial ESR (mΩ) at a frequency of 100 kHz was measured for the electrolytic capacitors of Examples and Comparative Examples prepared above in an environment of 20° C. using an LCR meter for 4-terminal measurement. In addition, a capacitance (μF) at a frequency of 120 Hz was measured. Further, the current flowing through the electrolytic capacitors at the time of holding them at a rated voltage for 40 seconds was measured, and the current value was obtained as the leakage current. Evaluation results are shown in Table 1.

In Table 1, the ESR value is shown as a relative value when the ESR value of electrolytic capacitor A5 is 100. In Table 1, the capacitance of electrolytic capacitor A5 was 100%, an electrolytic capacitor with a capacitance of more than or equal to 90% of the capacitance of electrolytic capacitor A5 is indicated by ○, and an electrolytic capacitor with a capacitance of less than 90% of the capacitance of electrolytic capacitor A5 was indicated by X. In Table 1, an electrolytic capacitor with a leakage current of less than or equal to 100 μA is indicated by ○, and an electrolytic capacitor with a leakage current of more than 100 μA is indicated by X.

TABLE 1

| Electrolytic capacitor | First conductive polymer | Conductivity (S/cm) of first conductive polymer (first layer) | ESR (relative value) | Leakage current | Capacitance |
|---|---|---|---|---|---|
| A1 | Polythiophene polymer | 0.06 | 96.2 | ○ | X |
| A2 | Polythiophene polymer | 0.1 | 93.6 | ○ | ○ |
| A3 | Polythiophene polymer | 0.5 | 93.8 | ○ | ○ |
| A4 | Polythiophene polymer | 1 | 97.5 | ○ | ○ |
| A5 | Polythiophene polymer | 2 | 100 | ○ | ○ |

TABLE 1-continued

| Electrolytic capacitor | First conductive polymer | Conductivity (S/cm) of first conductive polymer (first layer) | ESR (relative value) | Leakage current | Capacitance |
|---|---|---|---|---|---|
| B1 | Polythiophene polymer | 4 | 105 | X | ○ |
| B2 | Polythiophene polymer | 9 | 103 | X | ○ |
| B3 | Polyaniline polymer | 0.1 | 117 | ○ | ○ |

In electrolytic capacitors A1 to A5 in which the conductivity of the first layer containing the polythiophene polymer was less than or equal to 2 S/cm, an ESR lower than that in electrolytic capacitors B1 to B3 was obtained, and the leakage current was also small. In electrolytic capacitors A2 to A5 in which the conductivity of the first layer containing the polythiophene polymer was from 0.1 S/cm to 2 S/cm, inclusive, a high capacitance was obtained with a low ESR.

In electrolytic capacitors B1 and B2 in which the conductivity of the first layer containing the polythiophene polymer was larger than 2 S/cm, the ESR increased, and the leakage current also increased. This is considered to be because the conductivity of the first layer is larger than 2 S/cm, and the first layer is hardly insulated. In electrolytic capacitor B3, the conductivity of the first layer was less than or equal to 2 S/cm, but the ESR increased because the polyaniline polymer film was formed as the first layer.

The electrolytic capacitor according to the present invention is suitably used for applications requiring a low ESR.

Although the present invention has been described in terms of presently preferred exemplary embodiments, such disclosure should not be construed in a limiting manner. Various modifications and alterations will undoubtedly become apparent to the person of ordinary skill in the art to which the present invention belongs upon reading the above disclosure. Thus, the appended scope of claims should be construed to cover all modifications and alterations without departing from the true spirit and scope of the present invention.

The invention claimed is:

1. An electrolytic capacitor comprising:
an anode body;
a dielectric layer covering the anode body;
a first solid electrolyte layer covering the dielectric layer; and
a second solid electrolyte layer covering the first solid electrolyte layer,
wherein:
the first solid electrolyte layer contains a first conductive polymer being a self-doped type conductive polymer including polythiophene as a basic skeleton and having a conductivity of less than or equal to 2 S/cm,
the second solid electrolyte layer contains a second conductive polymer including polypyrrole as a basic skeleton, and
a conductivity of the first solid electrolyte layer is less than or equal to 2 S/cm.

2. The electrolytic capacitor according to claim 1, wherein the conductivity of the first solid electrolyte layer ranges from 0.1 S/cm to 0.5 S/cm, inclusive.

3. The electrolytic capacitor according to claim 1, wherein a thickness of the first solid electrolyte layer is less than or equal to 10 nm.

4. The electrolytic capacitor according to claim 1, wherein a thickness of the second solid electrolyte layer ranges from 50 nm to 100 nm, inclusive.

5. The electrolytic capacitor according to claim 1, wherein a conductivity of the second solid electrolyte layer is higher than the conductivity of the first solid electrolyte layer.

6. The electrolytic capacitor according to claim 5, wherein the conductivity of the second solid electrolyte layer ranges from 30 S/cm to 300 S/cm, inclusive.

7. The electrolytic capacitor according to claim 1, wherein the second solid electrolyte layer contains the second conductive polymer that is a non-self-doped type conductive polymer.

8. A method for producing an electrolytic capacitor, the method comprising:
a first step of preparing an anode body on which a dielectric layer is formed;
a second step of forming a first solid electrolyte layer containing a first conductive polymer on the dielectric layer, the first conductive polymer being a self-doped type conductive polymer including polythiophene as a basic skeleton and having a conductivity of less than or equal to 2 S/cm; and
a third step of forming a second solid electrolyte layer containing a second conductive polymer by performing electrolytic polymerization of a precursor of the second conductive polymer on the first solid electrolyte layer, the second conductive polymer including polypyrrole as a basic skeleton,
wherein a conductivity of the first solid electrolyte layer is less than or equal to 2 S/cm.

9. The method for producing an electrolytic capacitor according to claim 8, wherein the second step includes:
a step of preparing a first treatment liquid containing the first conductive polymer; and
a step of forming the first solid electrolyte layer containing the first conductive polymer by attaching the first treatment liquid to the dielectric layer.

* * * * *